US006811250B2

(12) United States Patent
Buchanan et al.

(10) Patent No.: US 6,811,250 B2
(45) Date of Patent: Nov. 2, 2004

(54) INK CONDUIT PLUGS FOR AN INKJET PRINTHEAD AND METHODS OF LASER WELDING SAME

(75) Inventors: Jeffrey James Buchanan, Lexington, KY (US); Ganesh Vinayak Phatak, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 59 days.

(21) Appl. No.: 10/299,942

(22) Filed: Nov. 19, 2002

(65) Prior Publication Data

US 2004/0095448 A1 May 20, 2004

(51) Int. Cl.[7] .............................................. B41J 2/175
(52) U.S. Cl. ....................................................... 347/87
(58) Field of Search ............................ 347/87, 86, 43, 347/84–85

(56) References Cited

U.S. PATENT DOCUMENTS

| | | |
|---|---|---|
| 4,960,973 A | 10/1990 | Fouche et al. |
| 5,280,980 A | 1/1994 | Hayes |
| 5,305,015 A | 4/1994 | Schantz et al. |
| 5,408,738 A | 4/1995 | Schantz et al. |
| 5,467,118 A | 11/1995 | Gragg et al. |
| 5,718,044 A | 2/1998 | Baughman et al. |
| 5,818,478 A | 10/1998 | Gibson |
| 5,847,356 A | 12/1998 | Santhanam |
| 5,950,309 A | 9/1999 | Bryce et al. |
| 6,380,511 B1 | 4/2002 | Santhanam |
| 6,554,413 B2 * | 4/2003 | Kubota ......................... 347/87 |
| 6,733,118 B2 * | 5/2004 | Pingrey et al. ............... 347/87 |

* cited by examiner

*Primary Examiner*—K. Feggins
(74) *Attorney, Agent, or Firm*—King & Schickli, PLLC

(57) ABSTRACT

An inkjet printhead having a unitary body with an ink conduit between an ink outlet port of an ink compartment and an ink feed slot compatible with a heater chip has an ink conduit plug laser welded thereto to prevent ink from leaking from the ink conduit as the ink flows from the ink outlet port to the ink feed slot during use. In one embodiment, the ink conduit plug has a lid and an insertion portion. The lid has a laser transparent periphery that becomes illuminated with a laser light to weld an undersurface thereof over an opening of the ink conduit. Techniques for laser welding include an advancing laser beam or a simultaneous welding structure. In another embodiment, the ink conduit plug has two plug sections banded together with either a flexible material or angularly disposed links. The banded plug sections may or may not be laser welded.

19 Claims, 8 Drawing Sheets

INK CONDUIT PLUGS FOR AN INKJET PRINTHEAD AND METHODS OF LASER WELDING SAME

FIELD OF THE INVENTION

The present invention relates to inkjet printheads. In particular, it relates to plugs for sealing ink conduits between an ink compartment and a heater chip in an inkjet printhead. Even more particularly, the invention relates to laser welding such ink conduit plugs to an inkjet printhead body.

BACKGROUND OF THE INVENTION

The art of inkjet printing is relatively well known. In general, an image is produced by emitting ink drops from an inkjet printhead at precise moments such that they impact a print medium, such as a sheet of paper, at a desired location. The printhead is supported by a movable print carriage within a device, such as an inkjet printer, and is caused to reciprocate relative to an advancing print medium and emit ink drops at such times pursuant to commands of a microprocessor or other controller. The timing of the ink drop emissions corresponds to a pattern of pixels of the image being printed. Other than printers, familiar devices incorporating inkjet technology include fax machines, all-in-ones, photo printers, and graphics plotters, to name a few.

A conventional thermal inkjet printhead includes access to a local or remote supply of color or mono ink, a heater chip, a nozzle or orifice plate attached to the heater chip, and an input/output connector, such as a tape automated bond (TAB) circuit, for electrically connecting the heater chip to the printer during use. The heater chip, in turn, typically includes a plurality of thin film resistors or heaters fabricated by deposition, masking and etching techniques on a substrate such as silicon.

To print or emit a single drop of ink, an individual heater is uniquely addressed with a small amount of current to rapidly heat a small volume of ink. This causes the ink to vaporize in a local ink chamber (between the heater and nozzle plate) and be ejected through and projected by the nozzle plate towards the print medium.

During manufacturing of the printheads, a single body of material, often plastic, becomes formed with a plurality of ink compartments that have ink conduits between the compartments and ink feed slots that, in turn, connect to the heater chip. The ink conduits are formed by moving core pins in the plastic molds that, in turn, cause openings in the body that require sealing, before use, so that ink does not leak.

In general, a plug adheres or welds to the opening of the ink conduit via ultrasonic vibration. Ultrasonic welding, however, often introduces flash particles or other into the printhead (which can clog the ink conduits and/or nozzle holes) which prematurely fails the printheads. Adhering has problems because of its impractical long cure time. U.S. Pat. No. 6,260,961, Seu et al, embodies an example of an ultrasonically welded or an adhered plug (seal member 66).

Accordingly, a need exists to reliably, consistently and quickly manufacture a printhead without causing clogging of the ink conduits and nozzles.

SUMMARY OF THE INVENTION

The above-mentioned and other problems become solved by applying the apparatus and method principles and teachings associated with the hereinafter described ink conduit plugs for inkjet printheads and methods for laser welding the plugs to the printheads.

In one embodiment, an inkjet printhead has a unitary body with an ink conduit between an ink outlet port of an ink compartment and an ink feed slot compatible with the ink slots of a heater chip. An ink conduit plug laser welds thereto to prevent ink from leaking from the ink conduit as the ink flows from the ink outlet port to the ink feed slot during use. In another embodiment, the ink conduit plug has a lid and an insertion portion. The lid has a laser transparent periphery that becomes irradiated with laser light to weld an undersurface of the lid over an opening (defined by a surface extending thereabout) of the ink conduit after the insertion portion gets inserted past the opening and the undersurface contacts the surface. Techniques for laser welding include advancing a laser beam around a topside periphery of the lid or simultaneously welding the topside periphery.

In still other embodiments, the ink conduit plug has two plug sections banded together with either a flexible material for bending the plugs sections into a specific orientation or a plurality of angularly disposed links for predisposing the plugs sections in a specific orientation. The ink conduit plug having banded plug sections may additionally become laser welded to seal ink conduits of an inkjet printhead. They may also have lids and insertion portions either of which may have laser light transparency characteristics.

An inkjet printer for housing the printhead is also disclosed.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENTS

In the following detailed description of the preferred embodiments, reference is made to the accompanying drawings that form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process or other changes may be made without departing from the scope of the present invention. The following detailed description is, therefore, not to be taken in a limiting sense, and the scope of the present invention is defined only by the appended claims and their equivalents.

In accordance with the present invention, we hereinafter describe banded ink conduit plugs and/or ink conduit plugs that laser weld and seal close ink conduits of inkjet printheads thereby eliminating the prior art problems associated with ultrasonically welded or adhered plugs.

Figure 1A:
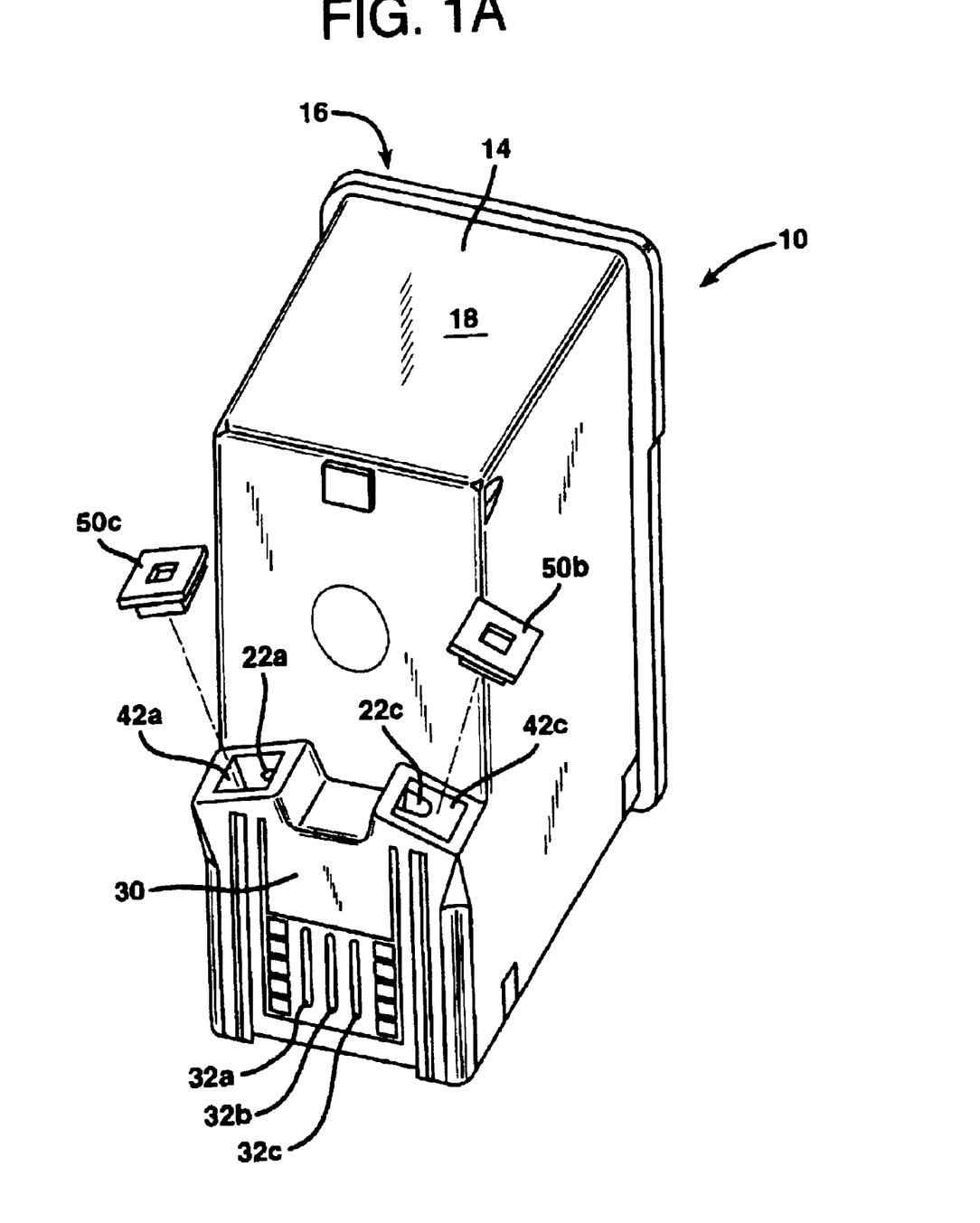
FIG. 1A is a bottom perspective view in accordance with the teachings of the present invention of an inkjet printhead having open ink conduits to be sealed closed by laser welding ink conduit plugs.
Figure 1B:
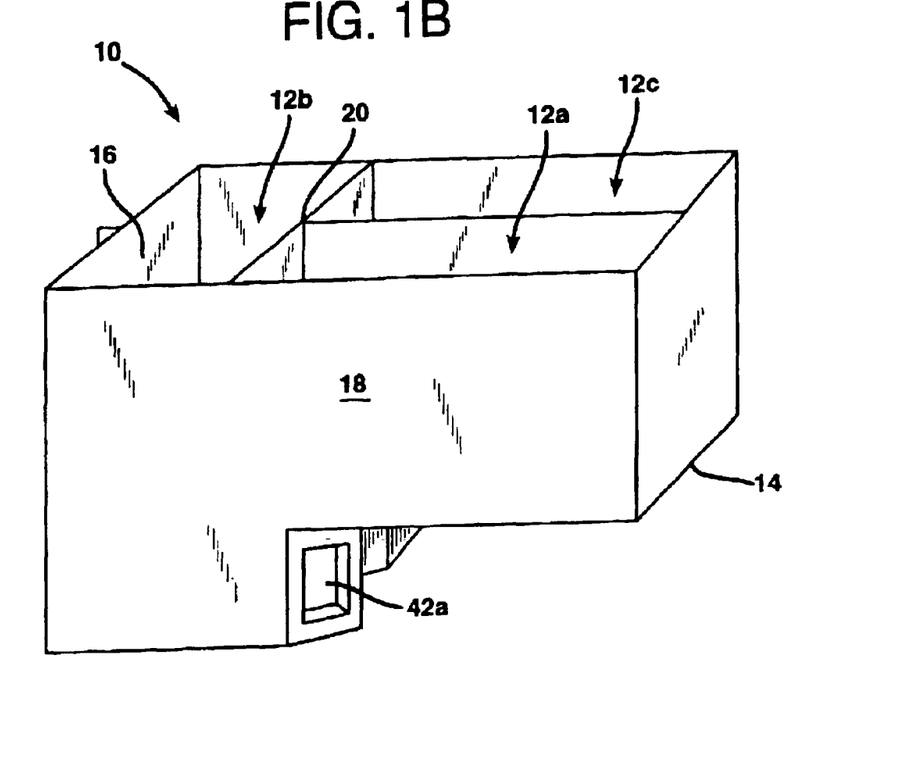
FIG. 1B is a side perspective view in accordance with the teachings of the present invention of the inkjet printhead of FIG. 1A.
Figure 1C:
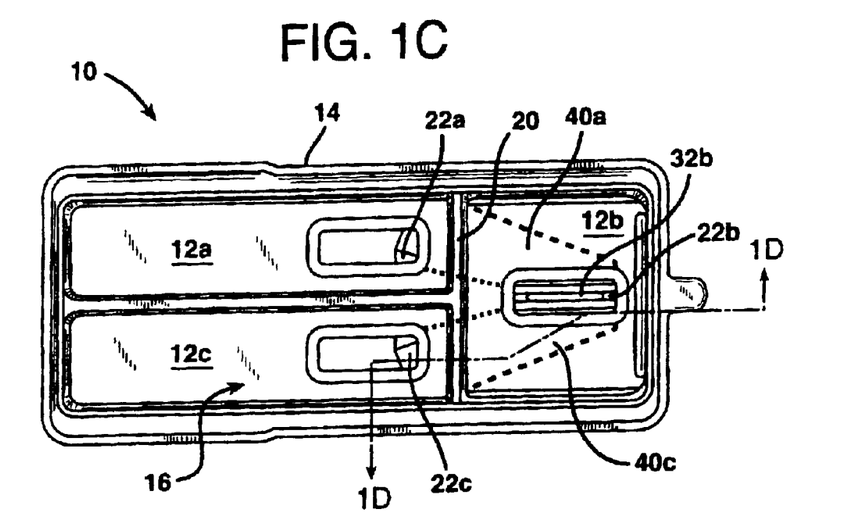
FIG. 1C is a top view in accordance with the teachings of the present invention of the inkjet printhead of the inkjet printhead of FIG. 1A.
Figure 1D:
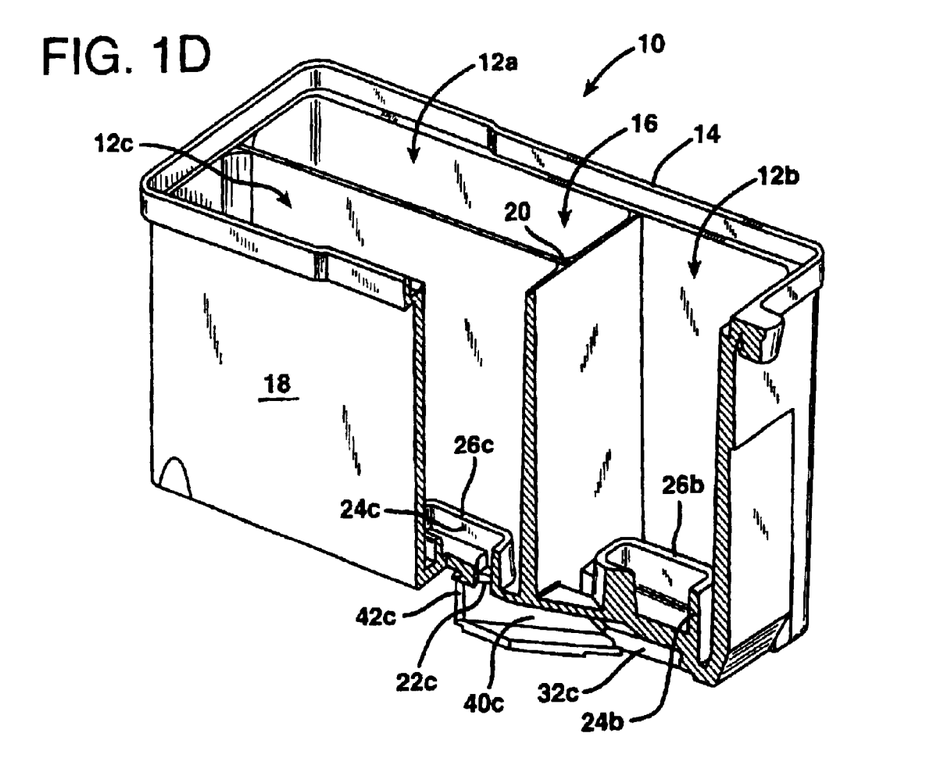
FIG. 1D is a cutaway side perspective view in accordance with the teachings of the present invention of the inkjet printhead of FIG. 1C.

In FIGS. 1A–1D, pluralities of views depict an inkjet printhead of the present invention generally as 10. The printhead has a unitary body 14 with an interior 16 and an exterior 18. Within the interior, pluralities of ink compartments 12 exist for holding an initial or refillable supply of ink. An interior wall 20 separates the ink compartments and, as depicted in FIG. 1C, the wall embodies a T-shape and separates three equal volume ink compartments. Preferably, the ink compartments contain an initial supply of cyan, magenta, and yellow ink. In other embodiments, the compartments contain black ink, photo-ink and/or plurals of cyan, magenta or yellow ink. Although not shown, those skilled in the art should appreciate that the ink compartments may also connect to a remote source of ink fed from a supply tube, for example. To create backpressure, the ink compartments further contain a foam insert or a pressure lung (not shown).

Near the bottom of the printhead body 14, as oriented during printing use, each ink compartment has an ink outlet port 22 for allowing ink to flow from the ink compartment. A standpipe 24 resides generally above the ink outlet port and may have a filter (not shown) disposed on an upper surface 26 thereof for preventing contaminants from flowing into the ink outlet port from the ink compartment.

Along an underside 30 of the body, a plurality of ink feed slots 32 exist that have a shape and orientation compatible with the ink slots of a to-be-attached heater chip. During use, ink from the ink compartments flows from the ink compartments 12 by way of the ink outlet ports 22 to the ink feed slots 32. Subscripts a, b and c have been designated with each ink compartment 12, each ink outlet port 22 and each ink feed slot 32 to respectively show which structure corresponds to which other structure. In general, ink from the forward ink compartment 12$b$ flows directly downward through ink outlet port 22$b$ to the ink feed slot 32$b$ while ink from the rearward ink compartments 12$a$, 12$c$ flows downward through ink outlet ports 22$a$, 22$c$, through generally horizontal ink conduits 40$a$, 40$c$ before reaching their respective ink feed slots 32$a$, 32$c$.

During unitary body 14 manufacturing, however, various core pins on the molding slide and cause an opening 42 of the ink conduit to form along the exterior 18 of the body 14. If left open or unsealed, such opening would allow ink to leak during use. Thus, the present invention contemplates the sealing of the opening with an ink conduit plug 50 to prevent ink from leaking as ink flows in the ink conduit path during use. Yet, to prevent contamination and/or clogging of the ink conduits and nozzle holes from flash particles, the present invention contemplates laser welding the ink conduit plugs to seal the openings 42 of the ink conduits 40.

Figure 2:
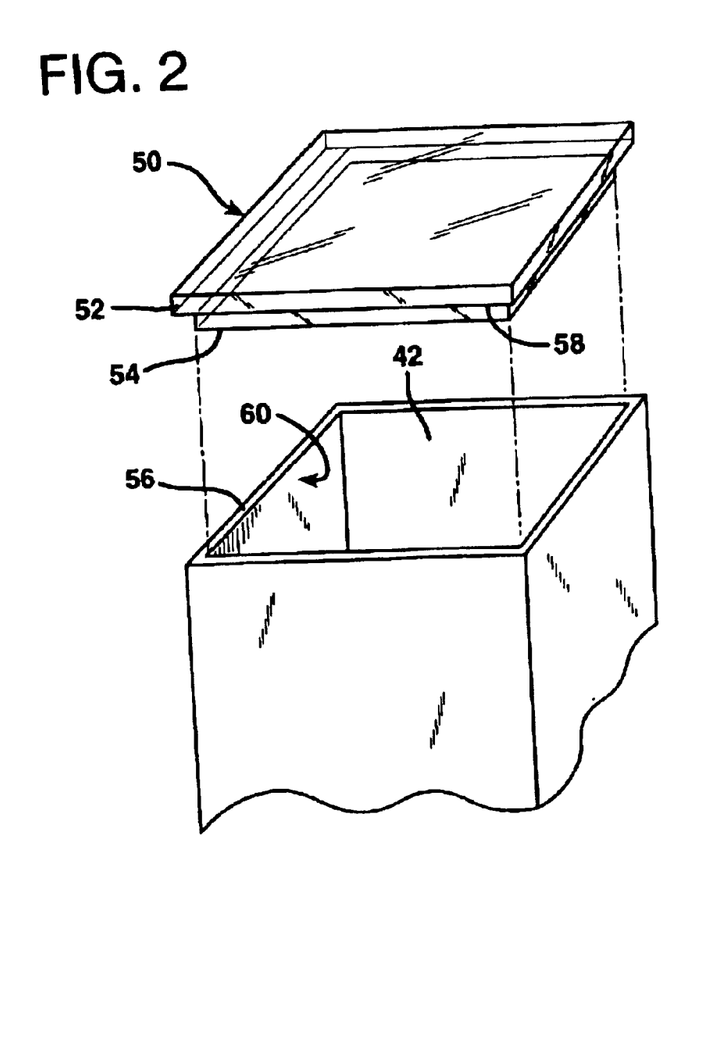
FIG. 2 is an exploded perspective view in accordance with the teachings of the present invention of an open ink conduit before being closed with an ink conduit plug.
Figure 3:
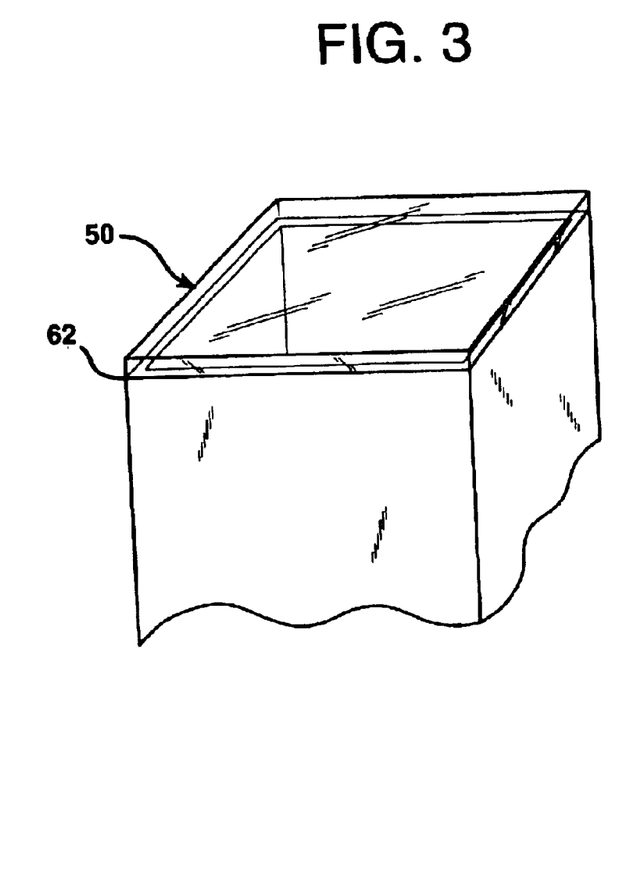
FIG. 3 is a perspective view in accordance with the teachings of the present invention of an ink conduit closed by an ink conduit plug.

With reference to FIG. 2, the ink conduit plug 50 has, in one embodiment, a lid 52 and an insertion portion 54. The ink conduit has a surface 56 that exists coplanarly with the opening 42 and surrounds and defines the opening. Before welding, the insertion portion 54 of the ink conduit plug gets inserted past the opening 42 where it frictionally engages the interior walls 60 of the ink conduit. Insertion of the insertion portion continues until an undersurface 58 of the lid 52 contacts the surface 56 of the ink conduit. FIG. 3 depicts a fully seated ink conduit plug 50. A laser weld interface 62 exists where the undersurface 58 contacts the surface 56.

While the ink conduit plugs 50 and the openings 42 thus far described have had a generally rectangular shape, this invention embraces any shape and may specifically include plugs, openings and surfaces with round, oval, diamond, polygon, curved, irregular or other configurations. Those skilled in the art should also appreciate that while the surface boundaries of the ink conduit plug 50 and the surface 56 have existed substantially coextensively with one another, that either or both could have portions that extend beyond the boundary of the other.

Still further, this invention contemplates an ink conduit plug 50 exclusively having a lid 52 that lacks the insertion portion 54. In such an embodiment, the invention contemplates merely sealing the opening 42 with the undersurface 58 while contacting a periphery of the undersurface to the surface 56 to form a weld interface 62 as shown in FIG. 3. Thus, FIG. 3 dually depicts an ink conduit plug 50 with or without an insertion portion.

In any embodiment, the composition for the ink conduit plug comprises at least a portion thereof having laser light transparency characteristics. In one form, the ink conduit plug is substantially entirely transparent to laser light and may or may not integrally form the lid together with the insertion portion 54. A preferred composition for the body includes polyphenylene ether plus polystyrene (PPE/PS) such as that found in Noryl brand SE1 resin and compositions for the lid include, but are not limited to, general purpose polystyrene, high impact polystyrene, such as styrene-butadiene copolymers (CBC), styrene-acrylic copolymers (SMMA). Still others include polyesters and polyester blends including polyethylene terephthalate (PET), polybutylene terephthalate (PBT), as well as blends of these plus polyearbonate (PC), acrylonitrile styrene acrylic (ASA) or other resins or other. When the body is of a PET composition, preferred lid compositions include the foregoing and/or may additionally include copolyesters, glycol modified PET (PETG), glycol modified polycyclohexylenemethylene terephthalate (PCTG), and acid modified PCT (PCTA) or other. Suitable welds were also found when the lid comprised materials having low loading levels of glass fiber such as natural PET (15% glass fiber) or blends of polyester types. Still other compositions include PC/PCTG, PC/PBT, PC/PET, PBT/PETG, PET/PBT although these sometimes require laser power adjustment when welding to polyester bodies. In still other embodiments, PBT/ASA was found to join to materials such as styrene methyl methacrylate (SMMA), and styrene acrylonitrile (SAN). One PET/PBT blend suprisingly formed good bonds with SMMA, clear ABS, ABS and methacrylate ABS (MABS). The materials discussed above are summarized in Appendix 1. Bear in mind, compatibility with inks can also be considered when selecting compositions.

Figure 4:
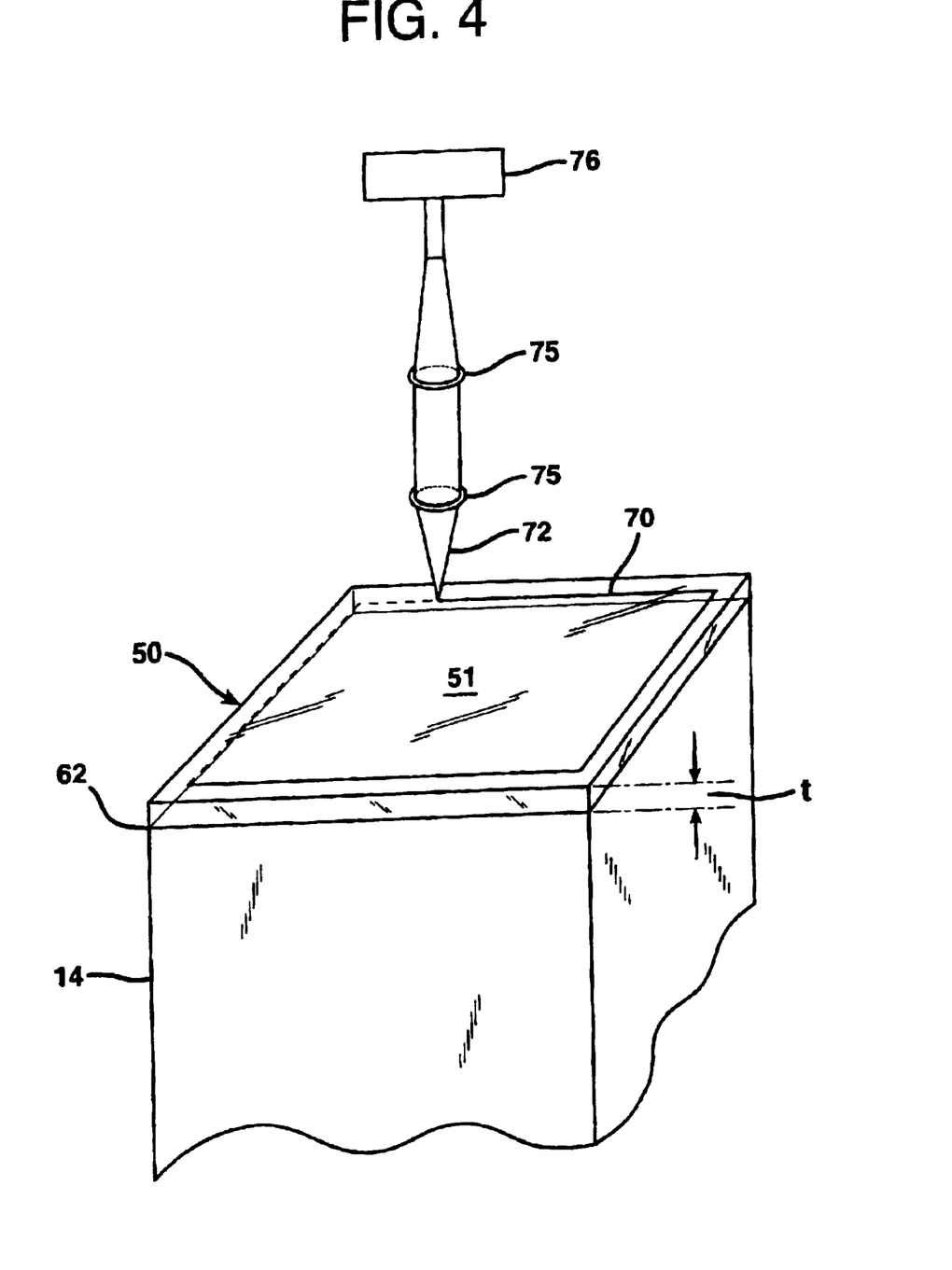
FIG. 4 is a perspective view in accordance with the teachings of the present invention of an ink conduit closed by an ink conduit plug and swept by a laser beam during a contour welding operation.

In another embodiment, since only that portion of the lid that exists above the weld interface 62 need become irradiated with laser light, it is only that portion of the lid that need have laser light transparency characteristics. Namely, another embodiment of the invention contemplates only a periphery of the ink conduit plug as having laser light transparency characteristics. As shown in FIG. 4, the periphery consists generally of that area of the ink conduit plug 50 adjacent the weld interface 62 that becomes illuminated with a beam of laser light 72 along a laser light path 70 (the dashed line represents that portion of the laser light path 70 not yet illuminated). As shown, it is the topside 51 of the ink conduit plug that becomes impacted by the incident beam of laser light.

In addition, the light path 70 shown depicts a method of laser welding the ink conduit plug to the ink conduit known as contour welding whereby the beam of laser light sweeps or advances along a path causing a laser weld in its wake. Preferably the entirety of the lid periphery becomes impacted with laser light but some embodiments embrace less than an entirety of the periphery becoming impacted with laser light.

We depict a plurality of lenses 75 for focusing or otherwise controlling the beam of laser light during welding but those skilled in the art should appreciate that we greatly simplified the optical path and it may additionally include other optical structures such as mirrors, fiber optic strands, light waveguides, laser scanning devices (e.g., rotating multi-faceted mirrors), other lenses or other. Preferably, the beam of laser light originates from a laser source 76 such as a laser diode.

In one embodiment, the laser source represents an 810 nm wavelength Aluminum Gallium Arsenide (AlGaAs) semiconductor laser having a laser power of about 50 watts.

Other embodiments include, but are not limited to, other types of continuous wave lasers with similar power intensity such as semiconductor lasers based on Indium Gallium Arsenide (InGaAs) with wavelengths 940–990 nm and Aluminum Gallium Indium Phosphide (AlGaInP) with wavelengths 630–680 nm, solid state lasers such as lamp pumped Neodymium-doped Yttrium Aluminum Garnet (Nd:YAG) with wavelength 1064 nm and diode pumped Neodymium-doped Yttrium Aluminum Garnet (Nd:YAG) with wavelength 1064 nm or other.

A clamping device, a pressing member or other (not shown) may be utilized to supply a pressing engagement between the ink conduit lid and the ink conduit to maintain relative positioning during welding.

As before, at least a portion of the ink conduit plug 50 embodies a laser light transparent material. The ink conduit, i.e., the body 14, embodies a laser light absorbent material. The transparency or absorbency of theses structures, however, does not mean that 100% laser light gets transmitted, blocked or absorbed. The transparency or opacity is only required to allow enough light to transit the ink conduit plug and get absorbed by the body to form an appropriate laser weld. During welding, the beam of laser light 72 passes through that portion of the ink conduit plug which is transparent to laser light where it gets absorbed by the body 14 which is absorbent to laser light. As the beam irradiates, the weld interface 62 heats up and causes the undersurface of the lid and the surface 46 to melt. Upon cooling, the two meld together and form an ink seal.

Since it is known that numerous parameters, such as thickness t, of a to-be-welded work piece implicate the satisfactoriness of the laser weld, the parameters are preferably selected such that at least 50% of the incident laser light impacting the ink conduit plug transits the ink conduit plug. Those skilled in the art know such parameters further include laser wavelength, incident angle of the laser beam, surface roughness of the work piece, temperature of the work pieces, composition of the work piece and, in the instance when the work pieces comprise plastics, additives such as flame retardants, plasticizers, fillers and colorants.

Figure 5:
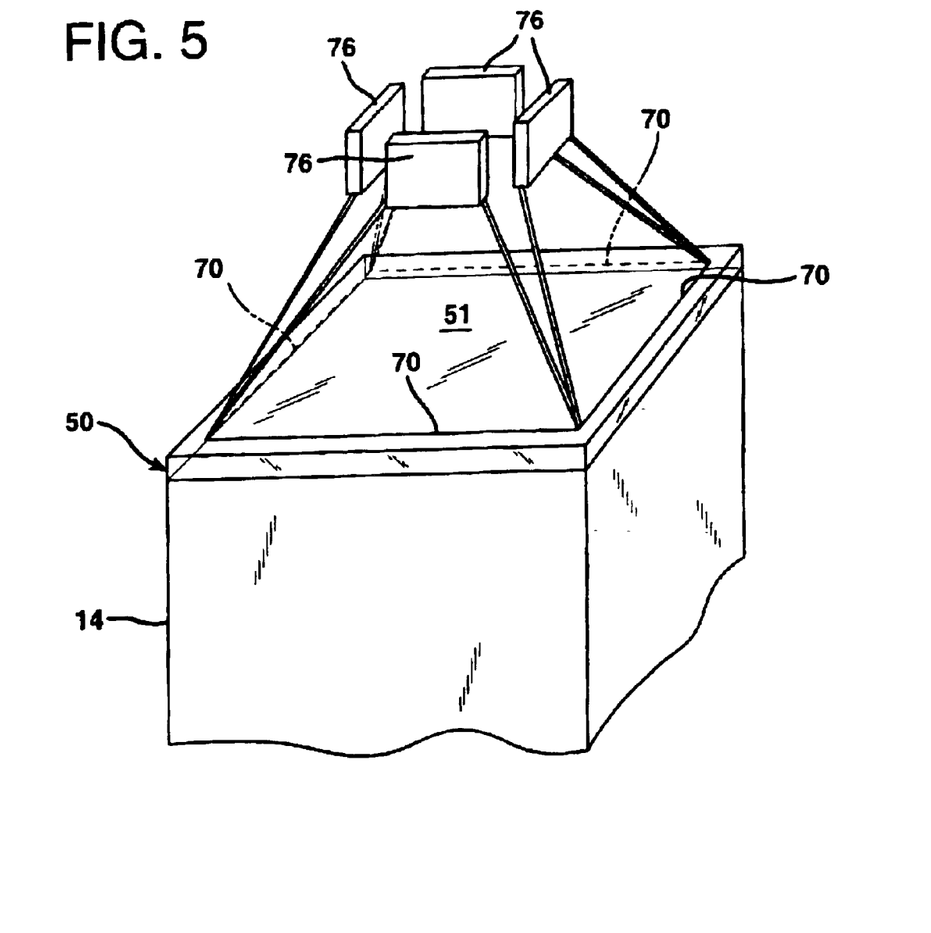
FIG. 5 is a perspective view in accordance with the teachings of the present invention of an ink conduit closed by an ink conduit plug being laser welded during a simultaneous welding operation.

In another method of laser welding ink conduit plugs 50, as shown in FIG. 5, pluralities of laser sources 76 contribute to forming a simultaneous welding structure that impact a topside 51 periphery of the ink conduit plug with substantially simultaneous laser light paths 70. As before, the figure depicts a greatly simplified optical path and it may also include fiber optics, light waveguides, mirrors, scanning devices, lenses, or other.

Figure 6A:
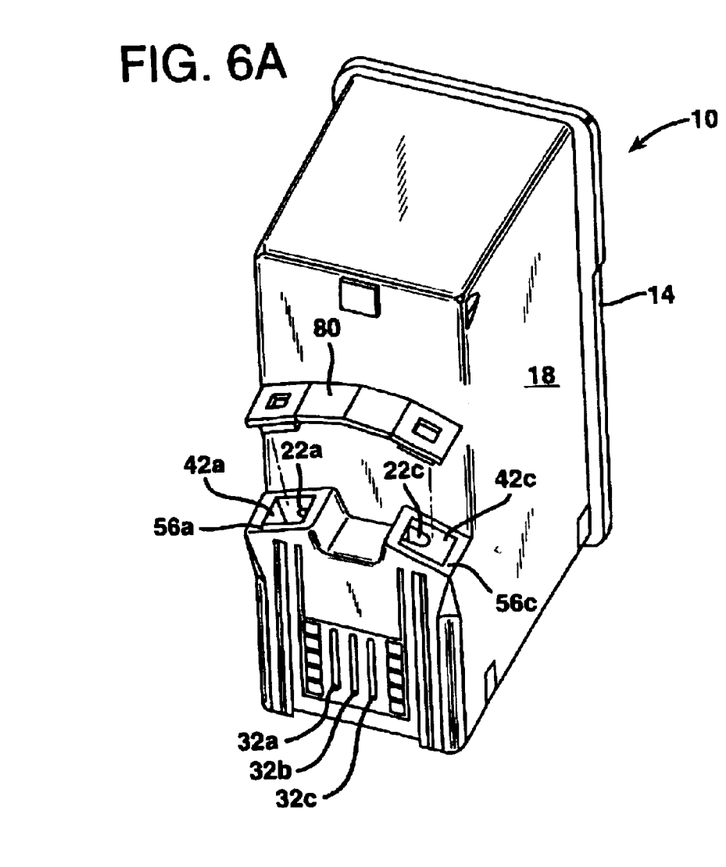
FIG. 6A is a bottom perspective view in accordance with the teachings of the present invention of an inkjet printhead having open ink conduits to be sealed closed with an ink conduit plug having two plug sections banded together.
Figure 6B:
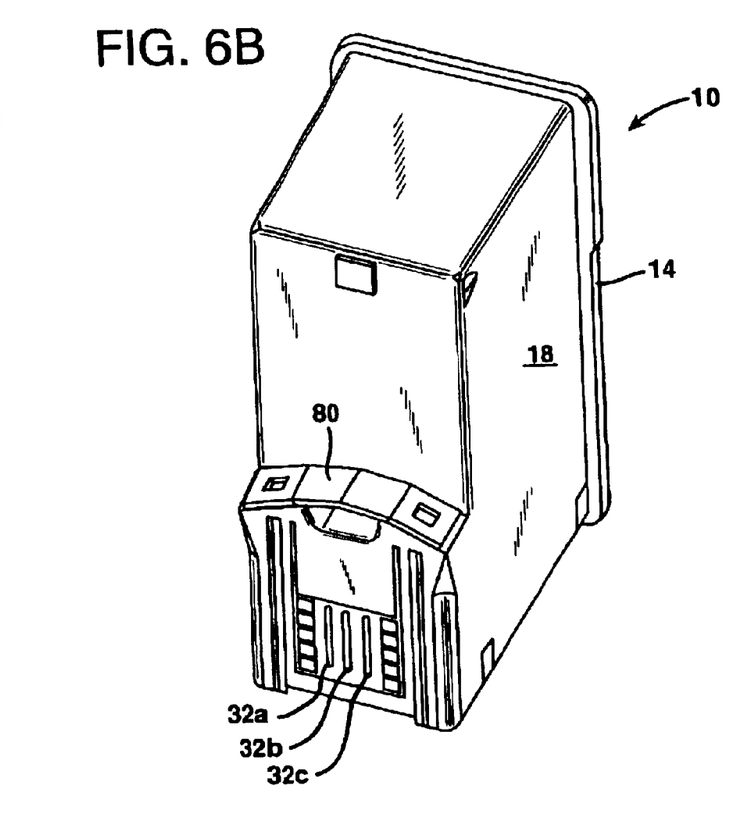
FIG. 6B is a perspective view in accordance with the teachings of the present invention of the inkjet printhead of FIG. 6A having ink conduits closed with an ink conduit plug having two plug sections banded together.
Figure 6C:
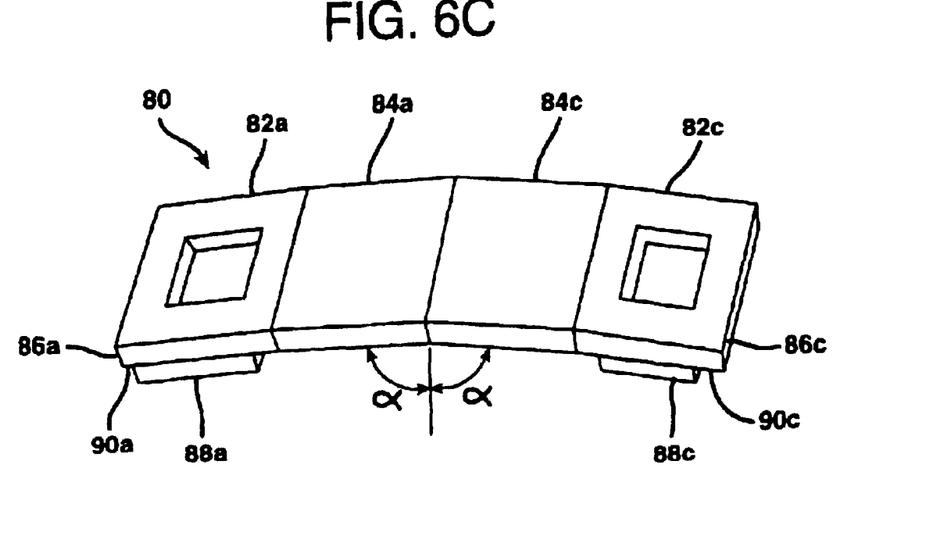
FIG. 6C is a perspective view in accordance with the teachings of the present invention of one embodiment of a banded ink conduit plug.

With reference to FIG. 6A, an inkjet printhead 10 has a plurality of openings 42a, 42c in ink conduits that exist between an ink outlet port 22a, 22c and ink feed slots 32a, 32c in an exterior 18 of a unitary body 14 that require sealing before use. In one embodiment, a banded ink conduit plug 80 seals the openings as shown in FIG. 6B. Referring to FIG. 6C, greater inspection of the banded ink conduit plug 80 reveals a plurality of plug sections 82 connected together by a plurality of links 84a, 84c. Each plug section 82a, 82c has a lid 86 and insertion portion 88 just like those previously described. The insertion portion 88a, 88c, fits past the opening 42a, 42c, respectively, and the undersurface 90a, 90c of the lid contacts a surface 56a, 56c that extends about and defines the opening. Since the opening 42a obliquely exists at some angle with respect to the opening 42c, the links 84a, 84c have an angular disposition (angle a with respect to a plane dividing the links) such that the two plug sections 82 are predisposed in a specific orientation that substantially matches the angular orientation of the two openings. Then, during manufacturing, an operator can conveniently, easily and simultaneously seal two openings of the ink conduits at one time.

Those skilled in the art should appreciate that while FIG. 6c, shows two links 84a, 84c, that any number of links may exist. The invention even contemplates a single preformed link molded such that the plug sections retain their specific, predetermined orientation. Even further, the invention contemplates that the shape and size of the links may vary according to design needs, such as seal strength, material composition, cost, ease of manufacturing, ornamentation, or other, and all are embraced herein. Still further, those skilled in the art should appreciate that the angular disposition for one link 84*a* may be different than the other link 84*c* and provided the angular disposition of the links exists such that the plug sections substantially match the angular orientation of the two openings, the invention satisfactorily works.

By reference to the above description, we herein incorporate all previous embodiments of the stand alone ink conduit plugs 50, and equivalents thereof, including the compositions, arrangement, structure, etc. For ease of manufacturing, it is preferred the links 84 have a composition substantially similar to the plug sections 82.

Figure 7:
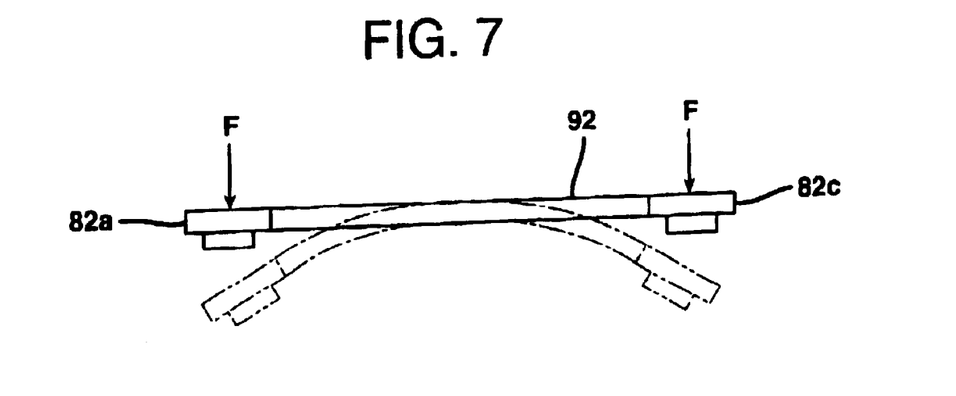
FIG. 7 is a side view in accordance with the teachings of the present invention of another embodiment of a banded ink conduit plug.

With reference to FIG. 7, a band of flexible material 92 replaces the link configuration of FIGS. 6A–6C and, upon application of force (indicated by force lines F), the flexible material bends the plug sections 82 into a specific orientation that preferably substantially matches the oblique orientation of the to-be-sealed openings 42. Preferred compositions of the flexible material include any composition used to make the plug sections and include polyethylene, polypropylene and thermoplastic chemically compatible plastics, any varieties of rubber or other.

Methods for attaching the band of links or flexible material to the plug sections include, but are not limited to, adhesion, heat staking, ultrasonic or laser welding, or other. While it is preferred that the banded ink conduit plugs laser welds the openings 42 closed, those skilled in the art will appreciate that this aspect of the invention may also find utility with prior art adhesion and ultrasonic welding methods and is, thus, not limited except by the appended claims.

Since the previously described ink conduit plugs seal ink conduits of an inkjet printhead, we further describe an example of an external device that uses printheads. In particular, with reference to FIG. 8, an external device, in the form of an inkjet printer, for containing the inkjet printhead 10 is shown generally as 401. The printer 401 includes a carriage 421 having a plurality of slots 441 for containing one or more printheads. The carriage 421 is caused to reciprocate (via an output 591 of a controller 571) along a shaft 481 above a print zone 461 by a motive force supplied to a drive belt 501 as is well known in the art. The reciprocation of the carriage 421 is performed relative to a print medium, such as a sheet of paper 521, that is advanced in the printer 401 along a paper path from an input tray 541, through the print zone 461, to an output tray 561.

Figure 8:
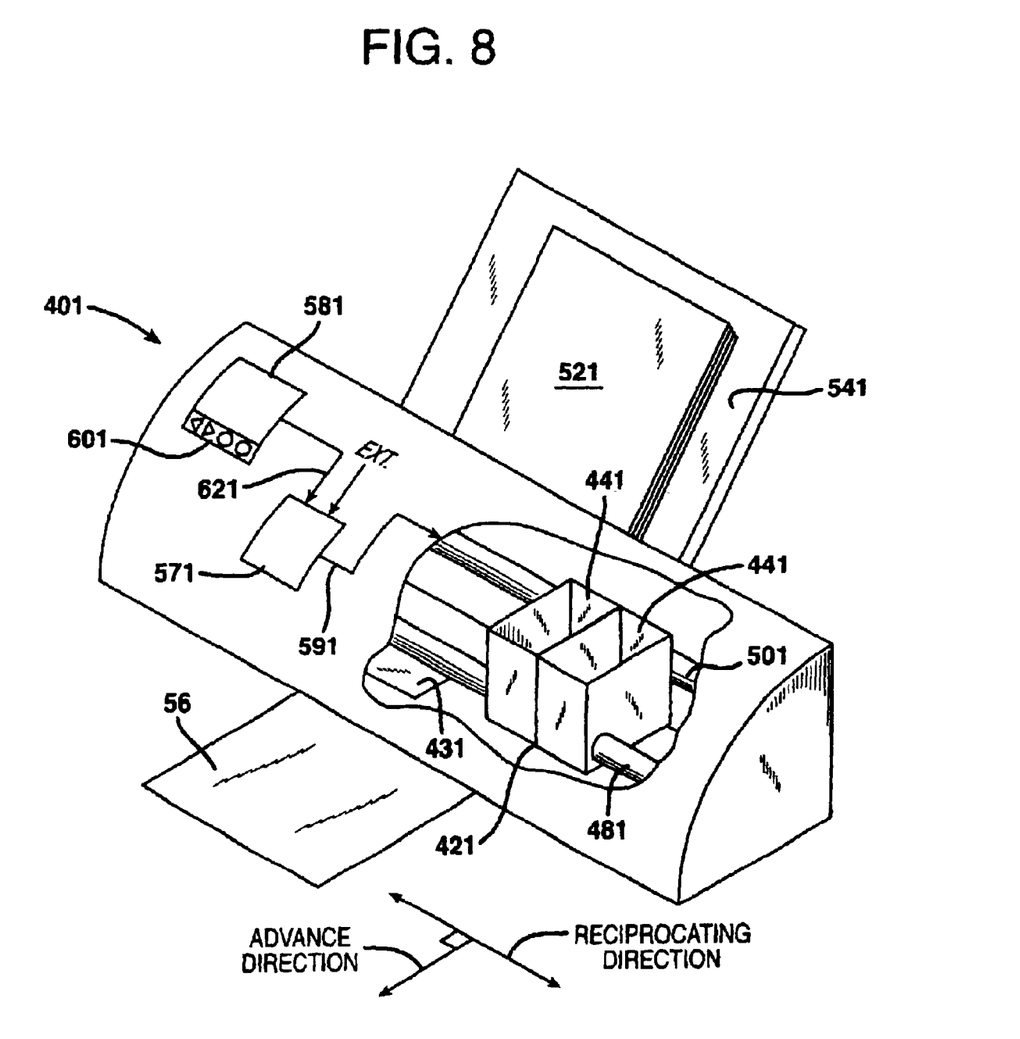
FIG. 8 is a perspective view in accordance with the teachings of the present invention of an inkjet printer for housing an inkjet printhead having ink conduit plugs laser welded in place and/or a banded ink conduit plug.

In the print zone, the carriage 421 reciprocates in the Reciprocating Direction generally perpendicularly to the paper Advance Direction as shown by the arrows. Ink drops from the printheads are caused to be ejected from the heater chip at such times pursuant to commands of a printer microprocessor or other controller 571. The timing of the ink drop emissions corresponds to a pattern of pixels of the image being printed. Often times, such patterns are generated in devices electrically connected to the controller (via Ext. input) that are external to the printer such as a computer, a scanner, a camera, a visual display unit, a personal data assistant, or other.

To print or emit a single drop of ink, the heaters are uniquely addressed with a small amount of current to rapidly heat a small volume of ink. This causes the ink to vaporize in a local ink chamber and be ejected through, and projected by, a nozzle plate towards the print medium.

A control panel 581 having user selection interface 601 may also provide input 621 to the controller 571 to enable additional printer capabilities and robustness.

As described herein, the term inkjet printhead may in addition to thermal technology include piezoelectric technology, or other, and may embody a side-shooter structure instead of the roof-shooter structure shown.

The foregoing description is presented for purposes of illustration and description of the various aspects of the invention. The descriptions are not intended to be exhaustive or to limit the invention to the precise form disclosed. The embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An inkjet printhead, comprising:
    a unitary body having an interior and an exterior with a plurality of ink compartments in the interior, each of the ink compartments having an ink outlet port;
    a plurality of ink feed slots each for receiving ink from one of the ink outlet ports, wherein at least one ink conduit exists between one of the ink outlet ports and one of the ink feed slots, the at least one ink conduit having an opening in the exterior of the body; and
    at least one ink conduit plug laser welded over the opening of the at least one ink conduit thereby substantially sealing the ink conduit and preventing any ink from leaking out of the opening as the ink flows through the ink conduit during use.

2. The inkjet printhead of claim 1, wherein the at least one ink conduit plug has a lid and an insertion portion, the insertion portion fitting past the opening while an undersurface of the lid contacts a surface that exists about the opening and defines the opening.

3. The inkjet printhead of claim 1, wherein the at least one ink conduit plug is substantially transparent to laser light about a periphery thereof.

4. The inkjet printhead of claim 1, wherein the body is substantially absorbent to laser light.

5. The inkjet printhead of claim 1, wherein the at least one ink conduit plug is substantially entirely transparent to laser light.

6. The inkjet printhead of claim 1, wherein each of the ink compartments contains ink.

7. An inkjet printhead, comprising:
    a unitary body substantially absorbent to laser light having an interior and an exterior with a plurality of ink compartments in the interior separated by at least one interior wall, each of the ink compartments having an initial volume of ink and an ink outlet port;
    a plurality of ink feed slots in the body equal to a number of ink compartments, each of the ink feed slots for receiving ink from one of the ink outlet ports wherein at least one ink conduit exists between one of the ink outlet ports and one of the ink feed slots, the at least one ink conduit having an opening in the exterior of the body, the opening being surrounded by and defined by a coplanarly existing surface; and
    at least one ink conduit plug having a lid transparent to laser light and an insertion portion, the insertion portion fitting past the opening while an undersurface of the lid is laser welded to the surface surrounding the opening to thereby substantially prevent any ink from leaking out of the opening as ink flows through the ink conduit during use.

8. The inkjet printhead of claim 7, wherein the insertion portion of the at least one conduit plug is substantially transparent to laser light.

9. The inkjet printhead of claim 7, wherein two ink conduit plugs exist, the two ink conduit plugs being banded together.

10. An ink conduit plug for laser welding to an ink conduit of an inkjet printhead, comprising:

- a plurality of plug sections each having a lid and an insertion portion, the insertion portion existing along an undersurface of the lid having a size and shape for fitting past an opening of the ink conduit; and
- a band for connecting the plurality of plug sections.

11. The ink conduit plug of claim 10, wherein the band is formed of a flexible material.

12. The ink conduit plug of claim 10, wherein the band is formed of a plurality of angularly disposed links to predispose the plurality of plug sections into a specific orientation.

13. An ink conduit plug for laser welding to an ink conduit of an inkjet printhead, comprising:

- a plurality of plug sections each having a lid and an insertion portion, the lid being transparent to laser light about a periphery thereof, the insertion portion existing along an undersurface of the lid having a size and shape for fitting past an opening of the ink conduit; and
- a band for connecting the plurality of plug sections, the band including one of a flexible material for bending the plurality of plug sections into a specific orientation and a plurality of angularly disposed links to predispose the plurality of plug sections into another specific orientation.

14. The ink conduit plug of claim 13, wherein the plurality of plug sections and the band have substantially similar compositions.

15. An inkjet printhead, comprising:

- a body having an interior and an exterior with a plurality of ink compartments in the interior, each of the ink compartments having an ink outlet port;
- a plurality of ink feed slots each for receiving ink from one of the ink outlet ports;
- at least two ink conduits, each existing between one of the ink outlet ports and one of the ink feed slots and having an opening in the exterior of the body; and
- at least two ink conduit plug sections, one each for covering one of the openings in the exterior of the body, the at least two ink conduit plug sections being banded together with one of a flexible material and a plurality of angularly disposed links.

16. The inkjet printhead of claim 15, wherein the ink conduit plug sections further include a lid and an insertion portion.

17. The inkjet printhead of claim 16, wherein the insertion portion frictionally engages an interior wall of the ink conduit.

18. The inkjet printhead of claim 16, wherein the lid is substantially transparent to laser light.

19. The inkjet printhead of claim 15, wherein the ink conduit plug sections have an angular disposition with respect to one another.

* * * * *